United States Patent [19]

Dyke et al.

[11] Patent Number: 4,967,193

[45] Date of Patent: Oct. 30, 1990

[54] DIGITAL LOOP CARRIER SYSTEM HAVING CPU TO CHANNEL UNIT PROTOCOL

[75] Inventors: Harry J. Dyke, Oak Forest; Dev R. Rattan, Chicago, both of Ill.

[73] Assignee: Rockwell International Corporation, El Segundo, Calif.

[21] Appl. No.: 244,961

[22] Filed: Sep. 15, 1988

[51] Int. Cl.$^5$ .............................................. H04Q 1/00
[52] U.S. Cl. .................. 340/825.030; 340/825.04; 340/825.5; 340/825.52; 370/95.1
[58] Field of Search ........... 340/825.5, 825.52, 825.07, 340/825.02, 825.03, 825.05, 825.04; 370/60, 85, 95, 67, 94, 110.1, 85.7, 95.1; 371/32, 34, 69.1; 364/940, 940.5, 940.71

[56] References Cited

U.S. PATENT DOCUMENTS

| | | | |
|---|---|---|---|
| 3,906,445 | 9/1975 | Beckmann et al. | 371/69.1 |
| 4,365,331 | 12/1982 | Biba et al. | 340/825.5 |
| 4,654,654 | 3/1987 | Butler et al. | 340/825.5 |
| 4,707,828 | 11/1987 | Yamada | 370/85 |
| 4,712,214 | 12/1987 | Meltzer et al. | 370/60 |

Primary Examiner—Donald J. Yusko
Assistant Examiner—Edwin C. Holloway, III
Attorney, Agent, or Firm—C. B. Patti; V. L. Sewell; H. F. Hamann

[57] ABSTRACT

Digital loop carrier system having CPU to channel unit protocol. A method of communicating with the protocol is used in a telecommunication system having at least a central processing unit (CPU) connected to a plurality of digital interface units (DIU) via a communication module (CM). Each of the digital interface units is connected to a plurality of channel units (CU). The method has the steps of: sending from the CPU to the COM a command message having at least a first DIU address of a selected DIU of the plurality of DIU's, a channel address of a selected CU of the plurality of CU's, a second DIU address, the second DIU address being substantially identical to the first DIU address, and a first information portion; sending substantially the command message from the COM to the plurality of DIU's, the selected DIU receiving the command message; and in the selected DIU removing the first DIU address from the command message to form a modified message, and sending the modified message from the selected DIU to the plurality of CU's, the selected CU receiving the modified message. The selected module provides a response message to the CPU. The protocol provides a comprehensive response format which identifies the responding module, type of response, and if in error, who detected the error and type of error detected.

16 Claims, 4 Drawing Sheets

DIGITAL LOOP CARRIER SYSTEM HAVING CPU TO CHANNEL UNIT PROTOCOL

BACKGROUND OF THE INVENTION

The present invention relates to an apparatus and method for use in channelizing telephone transmission equipment, and in particular, for providing a protocol for communication between a central processing unit and channel units.

The primary purpose of a PCM digital multiplexer system is the conversion of voice frequency signals to digital signals using standard sampling and encoding techniques and the multiplexing of 23 additional digitized samples into a T1 serial transmission format. Within the format of the T1 serial bit stream are 24 eight bit locations commonly referred to as time slots into which the encoded data can be placed. The normal approach to assigning these time slots to the individual channels has been on a fixed physical slot to time slot basis. In other words, each physical slot is identified to a particular time slot.

With the evolution of PCM carrier systems and a number of different timeslot assignment sequences, there is a requirement to provide the ability to re-assign physical slots to different timeslots within the T1 format in order to be backward compatible with the older systems.

In addition, there is a requirement to provide special conditioning of the analog portion of the circuit due to those transmission parameters which are caused by cable losses such as gain and equalization. Normally these parameters are adjusted by switches or potentiometers located on each channel unit. In order to provide a means to adjust these parameters and assign timeslots from a common database, a central processing unit must be able to communicate this information to each channel unit. The communication protocol devised for this particular application is the subject of this invention.

SUMMARY OF THE INVENTION

It is an object of the present invention to provide an improved method and apparatus having an improved protocol for communicating with channel units which can utilize one of a plurality of timeslots in a pulse code modulation serial transmission format, such as a T1 line.

The method of communicating is used in a telecommunication system having at least a central processing unit (CPU) connected to a plurality of digital interface units (DIU) via a communication module (CM). Each of the digital interface units is connected to a plurality of channel units. The method in general has the steps of:

sending from the CPU to the CM a command message having at least a first DIU address of a selected DIU of said plurality of DIU's, a channel address of a selected CU of said plurality of CU's, a second DIU address, the second DIU address substantially identical to the first DIU address, and an information portion;

sending substantially the command message from the CM to the plurality of DIU's, the selected DIU receiving the command message; and in the selected DIU removing the first DIU address from the command message to form a modified message, and sending the modified message from the selected DIU to the plurality of CU's, the selected CU receiving the modified message.

The protocol of the method further includes the response of the selected CU to the CPU.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DESCRIPTION OF THE PREFERRED EMBODIMENT

Figure 1:
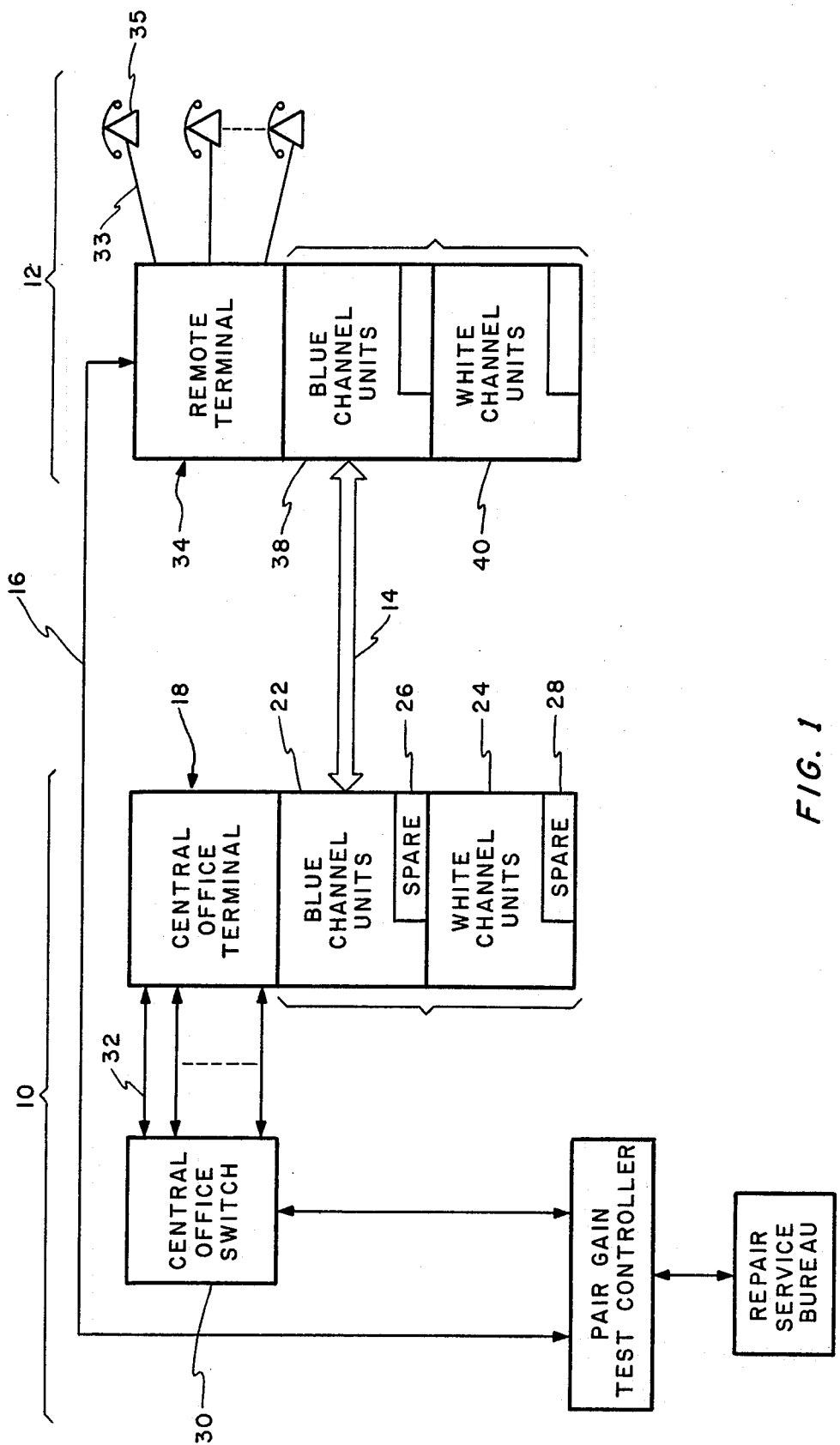
FIG. 1 is a general block diagram depicting a digital carrier loop system incorporating the present invention.

The present invention has general applicability but is most advantageously utilized in a digital loop carrier system of the type shown in FIG. 1.

As shown in FIG. 1, a central office location 10 is connected to a remote location 12 by digital transmission line system 14 and a bypass pair line 16. The transmission line system 14 is to be understood as having digital multipliers and digital lines between the central office terminal 18 and the remote terminal 34. The bypass pair line 16 is utilized for the pair gain test system. The central office 10 has a central office terminal 18 having channel banks. The channel banks are composed of a plurality of channel units in a blue channel system 22 and a white channel system 24. Each of the channel systems 22 and 24 contain at least one spare channel 26 and 28 respectively. The references to "white" and "blue" channel systems are terminology adapted by Rockwell International for its equipment.

The central office 10 also has a central office switch 30 which is connected by leads 32 to the central office terminal 18. Central office switches which are known in the prior art may be utilized for the central office switch 30 shown in FIG. 1. The central office terminal 18 provides derived subscriber channels over outgoing digital lines 14. A corresponding remote terminal 34 of the system separates the signals on the digital line 14 into a plurality of voice frequency analog signals on local drop wires 33 for delivery to a plurality of subscriber stations 35.

As shown in FIG. 1, each of the channel banks are divided into a white channel system 40 and a blue channel system 38 with reference to the remote terminal 34. The central office terminal 18 has a similar structure of channel banks. Typically, each of these channel systems 38 and 40 will contain 48 channel units.

Figure 2:
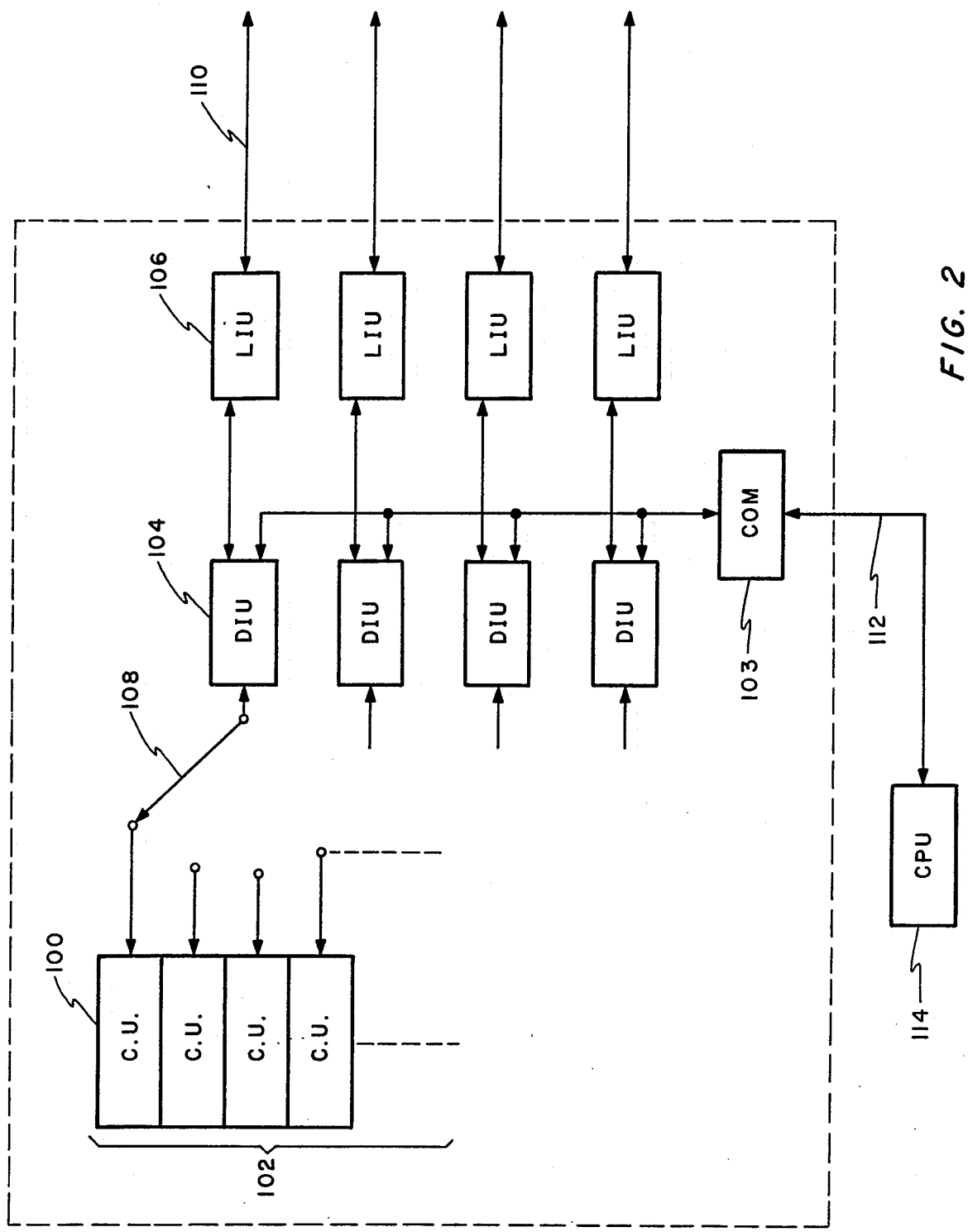
FIG. 2 is a block representation of one system in a channel bank at a remote terminal location.

As shown in FIGS. 1 and 2, each of the blue and white channel unit groups 22, 24 and 38, 40 in the central office terminal 18 and the remote terminal 34 have 96 channel units 100 divided into four digroups 102 of 24 channel units. A digital interface unit (DIU) 104 multiplexes the 24 channel units 100 onto the line interface unit (LIU) 106. The multiplexing function is symbolically represented by the switch 108. The LIU 106 is connected to a predetermined T1 line 110. The DIU 104 provides formatting, main clock source, multiplexing, etc. and the LIU 106 provides signal shaping, power, voltage levels, etc. A bus 112 connects a central processing unit (CPU) 114 to each DIU 104 via a communication module 103.

The architecture of the digital loop carrier system of the present invention requires a unique communication protocol in order to effectively communicate with all system modules on a timely basis and which meets the constraints of certain time dependent processes found in a digital loop carrier system.

Figure 3:
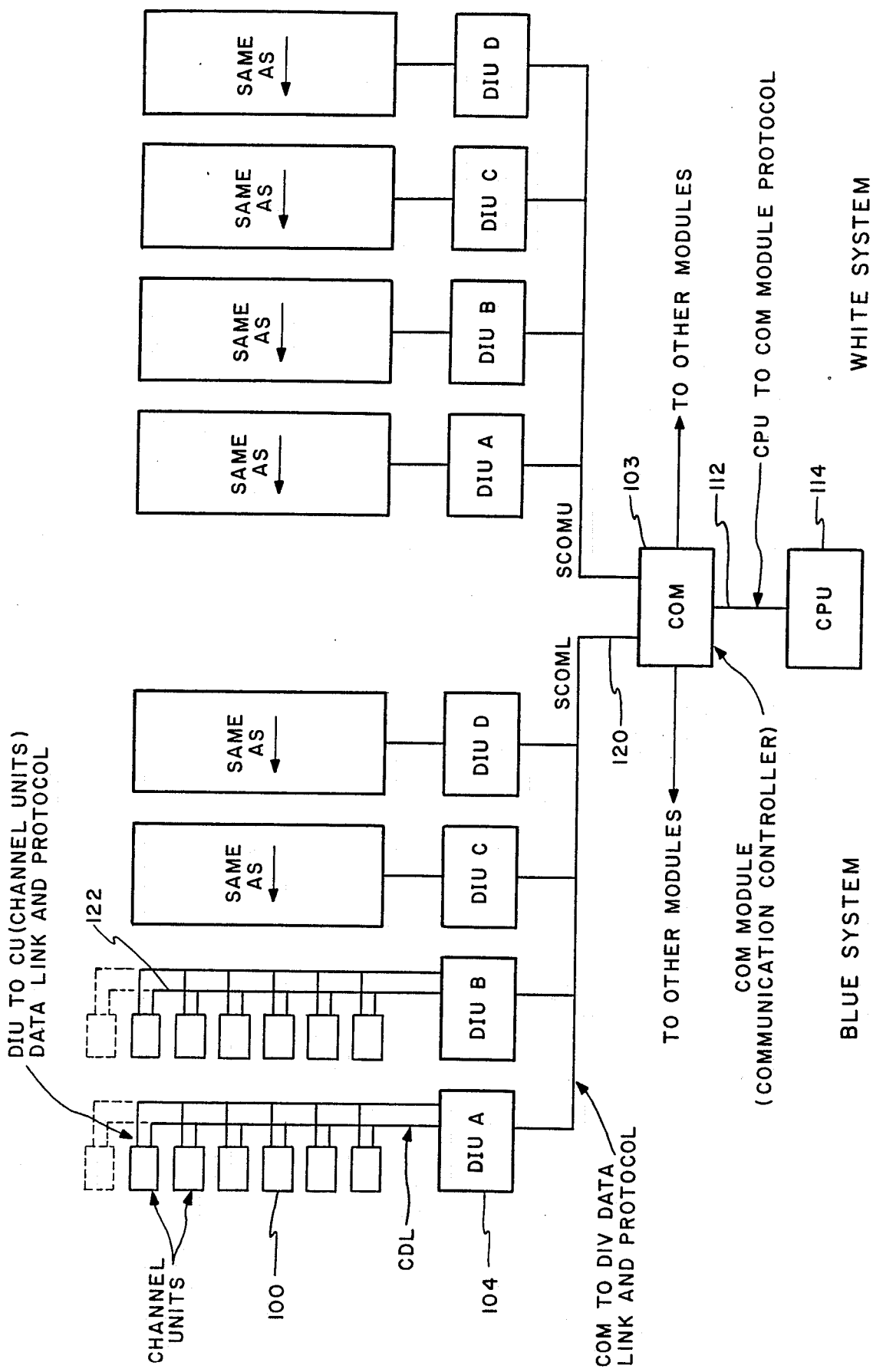
FIG. 3 is a block diagram showing the structure of the system and the various elements which are part of the communication protocol.

The structure of the system showing the communication module, the 8 DIU modules, and the 24 channel units connected to each DIU is shown in FIG. 3 along with the data links which utilized this protocol. A description of the protocol for each data link and the action of each element in processing the data link format follows.

DEFINITIONS OF ACRONYMS USED

SOM - Start of message byte, all 0's.

MAD - Message # for message identification and address of DIU.

CAD - Channel Unit (CU) address.

COM - Command to be interpreted by addressed unit.

RSP - Response to be interpreted by CPU.

DTL - Data length byte indicating number of data bytes.

DTA - Data bytes.

ECH - Error check performed on message by exclusive or 'ing consecutive bytes on a bit by bit basis.

DESCRIPTION OF PROTOCOL

The following command protocol is defined for the CPU 114 to CM module 103 data link 112 in FIG. 3.

Byte
1. Start of message (SOM) (Al zero's)
2. Message #/Address #1 (MAD) (DIU,FSU,COM,EEM,Etc.)
3. Channel address (CAD) (all zero's if not applicable)
4. Message #/Address #2 (MAD) (same as byte 2)
5. Command (COM)
6. Date length N (DTL)
6+N Data byte(s) (DTA)
7+N Error check (ECH) (2 to 6+N EX/or Byte wide)*

The following response protocol is expected by the CPU 114 from all modules:

Byte
1. Channel address (CAD) (all zero's if not applicable)
2. Message/address (MAD)
3. Response (RSP) (See byte description)
4. Data length N (DTL)
4+N Data byte(s) (DTA)
5+N Error check (ECH)

The following command protocol is defined for messages from the CM module 103 to the DIU 104: data link 120 in FIG. 3.

Byte
1. Message #/Address #1 (MAD) (DIU,FSU,COM,NUM)
2. Channel address (CAD) (all zero's if not applicable)
3. Message #/Address #2 (MAD) (same as byte 1)
4. Command (COM)
5. Data length N (DTL)
5+N Data byte(s) (DTA)
6+N Error check (ECH) (1 to 5+N)

The following protocol is defined for the DIU 104 to the channel units 100: data link 122 in FIG. 3.

Byte
1. Start of message (SOM) (inserted by DIU, all zero's)
2. Channel Address (CAD)
3. Message #/Address (MAD)
5. Data length N (DTL) **
5+N Data byte(s) (DTA) **
6+N Error check (ECH) (2 to 5+N)
7+N End of message (EOM) (inserted by DIU, all 1's)

DIU 104 must check for all zero's in data length and data bytes and insert an additional zero byte when detected for messages sent to channel unit 100. Data length does not include repeated bytes.

MODULE PROCESSING OF PROTOCOL

For outgoing messages from the CPU 114, the CM 103 performs the following action (must buffer entire message before error response):

(1) Read First Address (MAD)
(2) Compare with Second Address (MAD)
(3) Perform error check If there is not a good address comparison, or if there is a bad error check, or invalid command, then send CAD, MAD, set appropriate bits in error response RSP, and regenerate ECH back to CPU 114. If there is no CM Module Address, then send MAD, CAD, MAD, COM, DTL, DTA and regenerated ECH to DIU 104. If there is a CM Module Address, then execute command and send CAD, MAD, good RSP, DTL, DTA, and regenerated ECH back to CPU 114.

For DIU Action:
(1) Read Address (MAD)
(2) Check (CAD) for zero's (all zero's indicates DIU message)
(3) Compare with Second Address (MAD)
(4) Perform error check If there is not a good address comparison, or if there is a bad error check, or invalid command, then send CAD, MAD, set appropriate bits in error response RSP, and regenerated ECH back to CPU 114. If there is a channel Address, then check DTL and DTA bytes for zero's and repeat zero bytes, strip first MAD, add SOM, and send SOM, CAD, MAD, COM, DTL, DTA, regenerated ECH, and added EOM to CU 114. If there is a DIU Address, then execute command and send CAD, MAD, good RSP, DTL, DTA, and regenerated ECH back to CPU DIU must repeat any zero bytes to prevent other channel units from interpreting all zero's as a start of message. Channel unit should detect consecutive zero bytes and discard one of them.

For Channel Unit Action:
(1) Recognize Start of Message
(2) Recognize Address
(3) Perform Error Check If there is a bad error check or bad command, then send CAD, MAD, set appropriate bit in error response RSP, and regenerated ECH back to CPU 114.

If there is no error, then execute command and send CAD, MAD, good RSP, DTL, DTA, and regenerated ECH back to CPU 114.

If two consecutive zero bytes occur in DTL or DTA, one zero byte shall be saved and the other discarded. If only one zero byte occurs (not consecutive) the receiving process should be terminated and no response sent back to CPU 114.

For an incoming response from CU 100 to CPU 114, the Channel Unit Action is the same as described above. The DIU 104 Action is to pass entire channel unit response on to CM module 103 with no error check or regeneration of error check. The CM Module Action is to Perform Error Check and if error check is bad, then write over entire response byte with appropriate bits. If there is no error, then entire message is passed on to CPU 114.

The major features of this communication protocol are as follows:
Multiple Primary/Secondary Node Structure to Minimize Backplane Routing;
A synchronous Serial Format to Minimize Pin-Outs;
Command and Response Message Format;
Variable Message Length;
Message Tracking Capability;
Message Response Verification (Who, Type or Response, Error Location); and
Check sum Error Check at Each Node.

RESPONSE BYTE CODING

A good response or acknowledge of the command message is indicated by a zero in bit 8 of the returned response byte. A bad response to a command message is indicated by a one in bit 8 of the returned response byte. Bits 1 & 2 of the error response byte indicate where in the outgoing message the error was detected while bits 3 & 4 indicate where in the incoming message the error was detected Bits 5, 6 & 7 indicate the type of error detected. Outgoing error responses result in an immediate error response at the point of detection as there is no reason to send the command to the addressed module. Incoming error responses will write over the returned response byte regardless of either a good or bad received response.

Figure 4:
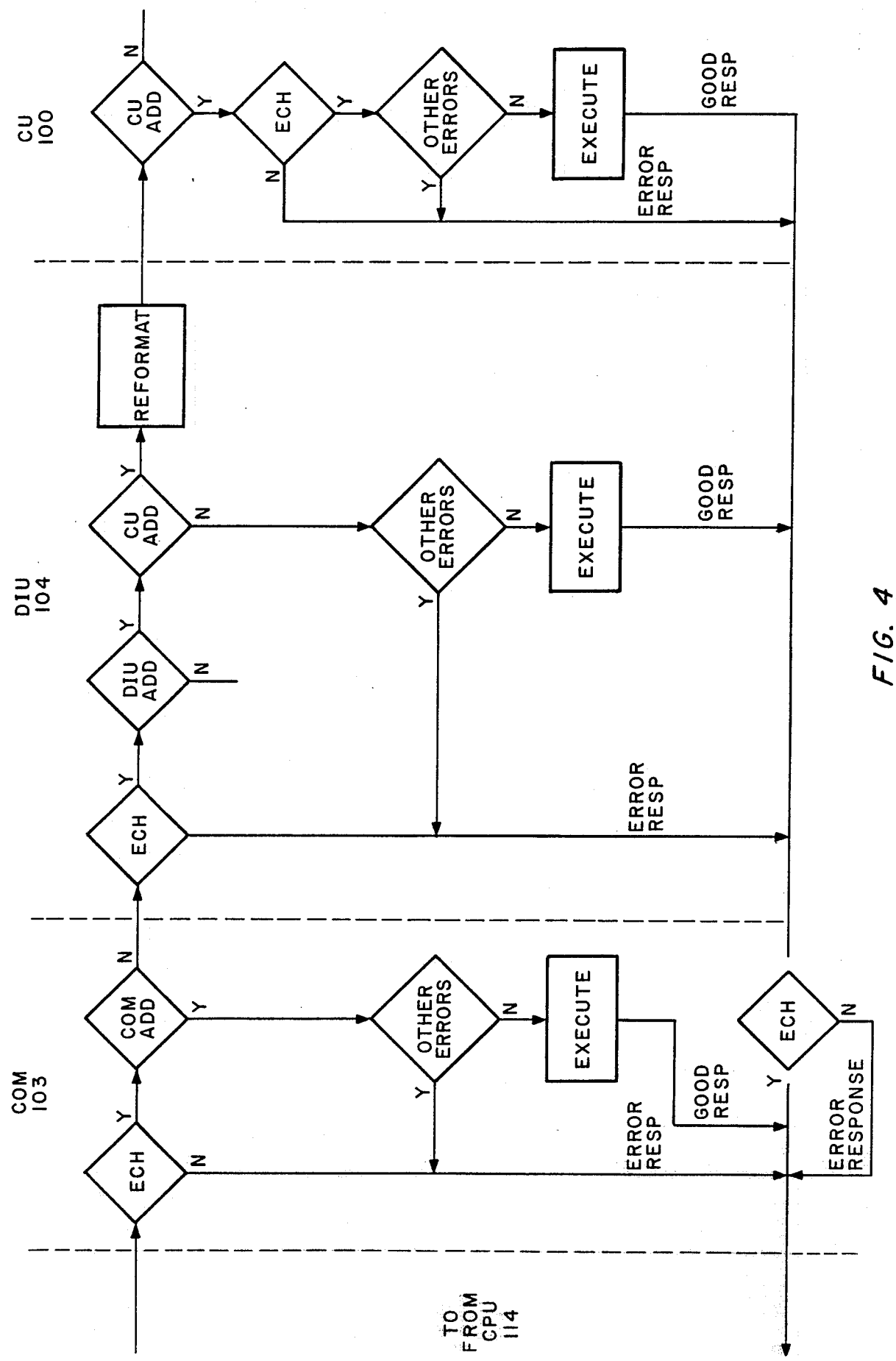
FIG. 4 is a flow chart which shows the basic communication flow, addressing, and error response paths.

FIG. 4 represents a flow chart showing the various paths a message can take depending upon its error check, its address, or its interpretation of the command or other error responses The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A method of communicating in a telecommunication system having at least a central processing unit (CPU) connected to a plurality of digital interface units (DIU) via a communication module (CM), each of said digital interface units connected to a plurality of channel units (CU), said method comprising the steps of:
    sending from said CPU to said CM a command message having at least a first DIU address of a selected DIU of said plurality of DIU's, a channel address of a selected CU of said plurality of CU's, a second DIU address, said second DIU address being substantially identical to said first DIU address, and a first information portion:
    checking for errors in said command message by at least said CM;
    sending substantially said command message from said CM to said plurality of DIU's, said selected DIU receiving said command message; and
    in said selected DIU removing said first DIU address from said command message to form a modified message, and sending said modified message from said selected DIU to said plurality of CU's, said selected CU receiving said modified message.

2. The method of claim 1 wherein said method further comprises sending a response message from said selected CU to said CPU, said response message containing at least said channel address, said second DIU address and a second information portion.

3. The method of claim 2 wherein said method further comprises checking for errors in said response message by said CM.

4. The method of claim 1 wherein said method further comprises checking for errors in said command message by said DIU.

5. The method of claim 1 wherein said method further comprises checking for errors in said command message by said CU.

6. The method of claim 1, wherein a selected DIU receives said command message from said CPU, said first information portion having at least a data length indicator and a series of data bytes, said selected DIU checks for all zeroes in said data length indicator and in said series of data bytes and when all zeroes are detected by said selected DIU, said selected DIU inserts an additional zero byte in said series of data bytes.

7. The method of claim 1, wherein said CM compares said first DIU address to said second DIU address and if said first and second DIU addresses are not identical, said CM sends an error response to said CPU.

8. The method of claim 7, wherein said CM also performs an error check and invalid command check on said command message and, if an error or an invalid command is identified, said CM send saids error response to said CPU.

9. The method of claim 1, wherein said selected DIU compares said first DIU address to said second DIU address and if said first and second DIU addresses are not identical, said selected DIU sends an error response to said CPU via said CM.

10. The method of claim 9, wherein said selected DIU also performs an error check and invalid command check on said command message and, if an error or an invalid command is identified, said selected DIU sends an error response to said CPU via said CM.

11. The method of claim 1, wherein said selected CU performs an error check on said modified message and, if an error is identified, said selected CU sends an error response to said CPU via said selected DIU and said CM.

12. A communication protocol for a telecommunication system having at least a central processing unit (CPU) connected to a plurality of digital interface units (DIU) via a communication module (CM), each of said digital interface units (DIU) connected to a plurality of channel units (CU), said communication protocol comprising:
    sending from said CPU to said CM a message having a plurality of bytes wherein;
    a first byte is Start of message (SOM)
    a second byte is Message #/Address #1 (MAD)
    a third byte is Channel address (CAD)
    a fourth byte is Message #/Address #2 (MAD)
    a fifth byte is Command (COM)

a sixth byte is Date length N (DTL)
six +n bytes are Data byte(s) (DTA)
seven +n bytes are Error check (ECH)
sending from one of said CU's to said CPU a message having a plurality of bytes wherein;
a first byte is Channel address (CAD)
a second byte is Message/address (MAD)
a third byte is Response (RSP)
a fourth byte is Data length N (DTL)
four +n bytes are Data byte(s) (DTA)
five +n bytes are Error Check (ECH)
sensing from said CM to one of said DIU's a message having a plurality of bytes wherein;
a first byte is Message #/Address #1 (MAD)
a second byte is Channel address (CAD)
a third byte is Message #/Address #2 (MAD)
a fourth byte is Command (COM)
a fifth byte is Data length N (DTL)
five +n bytes are Date byte(s) (DTA)
six +n bytes are Error Check (ECH) sending from said one of said DIU's to said one of said Cu's a message having a plurality of bytes wherein;
a first byte is Start of message (SOM)
a second byte is Channel address (CAD)
a third byte is Message #/Address (MAD)
a fifth byte is Data length N (DTL)
six +n bytes are Error Check (ECH)
seven +n bytes are End of Message (EOM),
said one of said DIU's checking for all zeroes in a data length and data bytes and inserting an additional zero byte when detected for messages sent to said one of said channel units.

13. A communication protocol according to claim 12, wherein from said CPU to said CM, said CM performs the following action:
(1) Read First Address (MAD)
(2) Compare with Second Address (MAD)
(3) Perform error check,
if there is not a good address comparison, or if there is a bad error check, or invalid command, then send CAD, MAD, set appropriate bits in error response RSP, and regenerated ECH back to CPU, if there is no CM Module Address (CMM) in Message #/Address #1, then send MAD, CAD, MAD, COM; DTL, DTA and regenerated ECH to DIU 104, and if there is a CM Module Address, then execute command and send CAD, MAD, good RSP, DTL, DTA, and regenerated ECH back to CPU.

14. A communication protocol according to claim 12, wherein from said CM to one of said DIU's, said one of said DIU's performs the following action:
(1) Read Address (MAD)
(2) Check (CAD) for zero's
(3) Compare with Second Address (MAD)
(4) Perform error check,
if there is not a good address comparison, or if there is a bad error check, or invalid command, then send CAD, MAD, set appropriate bits in error response RSP, and regenerated ECH back to CPU, and if there is a channel Address in CAD, then check DTL and DTA bytes for zero's and repeat zero bytes, strip first MAD, add SOM, and send SOM, CAD, MAD, COM, DTL, DTA, regenerated ECH, and added EOM to CU, and if there is a DIU Address, then execute command and send CAD, MAD, good RSP, DTL, DTA, and regenerated ECH back to CPU.

15. A communication protocol according to claim 14, wherein said one of said DIU's reporting any zero bytes to prevent CU's other than said one of said CU's from interpreting all zero's as a start of message.

16. A communication protocol according to claim 12, wherein from said one said DIU's to one of said CU's, said one of said CU's performs the following action:
(1) Recognize Start of Message
(2) Recognize Address
(3) Perform Error Check,
if there is a bad error check of bad command, then send CAD, MAD, set appropriate bit in error response RSP, and regenerated ECH back to CPU, and if there is no error, then execute command and send CAD, MAD, good RSP, DTL, DTA, and regenerated ECH back to CPU, and if two consecutive zero bytes occur in DTL or DTA, saving one zero byte and discarding the other and, if only one zero byte occurs, terminating the receiving process and sending no response back to CPU.

* * * * *